United States Patent
Messina et al.

(10) Patent No.: US 12,337,977 B2
(45) Date of Patent: Jun. 24, 2025

(54) AIRCRAFT PYLON FAIRING, FAIRING ASSEMBLY, AIRCRAFT PYLON AND AIRCRAFT

(71) Applicant: Airbus Operations SAS, Toulouse (FR)

(72) Inventors: Paolo Messina, Toulouse (FR);
Thomas Robiglio, Toulouse (FR);
Thomas Firmignac, Labege (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 18/457,148

(22) Filed: Aug. 28, 2023

(65) Prior Publication Data
US 2025/0074608 A1     Mar. 6, 2025

(30) Foreign Application Priority Data

Aug. 30, 2022   (FR) ..................... 2208690

(51) Int. Cl.
*B64D 27/40*     (2024.01)
*B64F 5/10*      (2017.01)

(52) U.S. Cl.
CPC ............... *B64D 27/40* (2024.01); *B64F 5/10* (2017.01); *B64D 27/406* (2024.01)

(58) Field of Classification Search
CPC ........ B64D 29/02; B64D 27/12; B64D 27/18; B64D 27/31; B64D 29/06; B64C 7/00
See application file for complete search history.

(56) References Cited

U.S. PATENT DOCUMENTS

| 5,459,935 | A | * | 10/1995 | Paulson | G01C 9/28 |
|---|---|---|---|---|---|
| | | | | | 33/499 |
| 2009/0283631 | A1 | * | 11/2009 | Roche | B64D 29/08 |
| | | | | | 244/54 |
| 2011/0127370 | A1 | * | 6/2011 | Ramlaoui | B64D 29/06 |
| | | | | | 244/54 |
| 2011/0290936 | A1 | | 12/2011 | Machado et al. | |
| 2012/0190680 | A1 | | 7/2012 | Bakthavatchalam et al. | |

(Continued)

FOREIGN PATENT DOCUMENTS

| EP | 2190739 B1 | 2/2011 |
|---|---|---|
| EP | 2390187 A2 | 11/2011 |

(Continued)

OTHER PUBLICATIONS

French Search Report for corresponding French Patent Application No. 2208690 dated Mar. 16, 2023.

*Primary Examiner* — Ashesh Dangol
(74) *Attorney, Agent, or Firm* — Greer, Burns & Crain, Ltd.

(57) ABSTRACT

An aircraft pylon comprising an aircraft pylon fairing extending along a longitudinal axis, a primary structure having a peg that is inserted in a through opening of an inner rib of the fairing and four yokes as well as four removable fixing elements that can be inserted from the outside of the fairing. The fixing elements are inserted in a direction perpendicular to said longitudinal axis of the fairing in order to hold in place a fitting of the primary structure that has an oblong through opening and is inserted into one of said yokes of the fairing. Also a method of assembling an aircraft pylon and an aircraft with such a pylon.

7 Claims, 5 Drawing Sheets

(56) References Cited

U.S. PATENT DOCUMENTS

| | | |
|---|---|---|
| 2013/0105622 A1 | 5/2013 | Journade |
| 2016/0001888 A1* | 1/2016 | Shephard et al. |
| 2019/0232825 A1* | 8/2019 | Chintapudi ............ B60N 2/682 |
| 2023/0192296 A1* | 6/2023 | Prager ...................... B64D 1/22 |
| | | 258/1.2 |

FOREIGN PATENT DOCUMENTS

| | | |
|---|---|---|
| EP | 2583900 A2 | 4/2013 |
| EP | 2964531 B1 | 6/2019 |
| FR | 2964947 A1 | 3/2012 |

\* cited by examiner

AIRCRAFT PYLON FAIRING, FAIRING ASSEMBLY, AIRCRAFT PYLON AND AIRCRAFT

CROSS-REFERENCES TO RELATED APPLICATIONS

This application claims the benefit of French Patent Application Number 2208690 filed on Aug. 30, 2022, the entire disclosure of which is incorporated herein by way of reference.

FIELD OF THE INVENTION

The present invention relates to an aircraft pylon fairing, notably to an aircraft pylon rear fairing. The invention relates more particularly to a pylon fairing assembly comprising a fairing and elements for fixing the fairing to the primary structure of the aircraft, and to an aircraft pylon comprising such a fairing assembly and to an aircraft comprising such a pylon.

BACKGROUND OF THE INVENTION

Aircraft fairings are notably used to provide aerodynamic surfaces that make it possible to obtain good flight performance and reduce fuel consumption. Certain fairings, including those arranged around the aircraft engine, are intended to withstand high stresses. These stresses are the result, for example, of a high temperature, of appreciable vibration, or else of a need to access elements cited behind the fairing. The rear fairings of aircraft pylons, which is to say those that cover the rear of the pylon used to attach an engine (also known as engine pylon), are often considered to be rear secondary structures of the aircraft. In other words, they are fixed to a primary structure of the aircraft and load needs to be able to be transferred from the primary structure to these fairings, and vice versa. In order not to introduce unnecessary mechanical constraints, a statically determinate mounting of the aircraft pylon rear fairings is desired. Usually, the points of attachment of the fairing to the primary structure, also known as interfaces, are duplicated according to the known 'failsafe' principle, so that should one of them fail, the fixing point that duplicates the damaged one can perform the required load transfer. Specifically, the position of an aircraft pylon rear fairing makes it vulnerable if a main landing gear tire should burst. When that happens, it is possible for two fixing points operating as duplicates of each other to be broken simultaneously.

In addition, the fixing interfaces for these fairings are generally internal and require complex assembly operations during the building of the aircraft or during maintenance operations, or else the fitting of inspection hatches.

This situation can be improved.

SUMMARY OF THE INVENTION

One object of the present invention is to propose an aircraft pylon fairing that allows the statically determinate mounting using fixing points that are better protected in the event of a landing gear tire bursting, that is easy to assemble from the outside but at the same time limits the number of parts required to do so.

To this end, what is proposed is an aircraft pylon fairing extending along a longitudinal axis and comprising a wall having at least two opposite flanks oriented respectively one on each side of said longitudinal axis, and a central interior cavity, the two opposite flanks meeting in the lower or upper part of said fairing, said fairing comprising:

a front transverse rib securely fixed to said wall and extending perpendicularly on each side of said longitudinal axis, said front transverse rib comprising a through opening configured to accept a peg of an exterior structure by push-fitting in a direction parallel to said longitudinal axis, and comprising two yokes each having bores along a longitudinal axis oriented perpendicular to said longitudinal axis of the fairing and arranged facing a through opening in one of said opposing flanks, and a rear transverse rib securely fixed to said wall and extending perpendicularly on each side of said longitudinal axis and comprising two yokes each having bores along a longitudinal axis oriented perpendicular to said longitudinal axis of the fairing and arranged facing a through opening in one of said opposing flanks.

Another subject of the invention is a fairing assembly comprising an aircraft pylon fairing as described hereinabove and four fixing elements which are configured to each be inserted into and held in position in a bore of one of said yokes.

According to one embodiment, the aircraft pylon comprises a fairing assembly as aforementioned and an aircraft primary structure, the aircraft primary structure comprising a peg oriented along an axis parallel to the longitudinal axis of the fairing and arranged to be inserted into the through opening of the front transverse rib, and four fittings which are respectively arranged in such a way as to each be inserted into one of said yokes and each having a through opening configured to be arranged facing the bore of said yoke and configured to receive a portion of one of said four fixing elements which is inserted into the bore of said yoke, the openings in the fittings which are intended to be inserted into the yokes of the front transverse rib of the fairing having an oblong shape extending in a direction perpendicular to the longitudinal axis of the fairing, and said openings in the fittings that are intended to be inserted into the yokes of the rear transverse rib of said fairing having an oblong shape extending along an axis parallel to said longitudinal axis of said fairing, or vice versa.

According to one embodiment, the openings in the fittings intended to be inserted into the yokes of the front transverse rib of said fairing have an oblong shape extending in a direction perpendicular to the longitudinal axis of the fairing, and the openings of the fittings intended to be inserted into the yokes of the rear transverse rib of said fairing have an oblong shape extending along an axis parallel to said longitudinal axis of said fairing.

According to one embodiment, the openings in the fittings intended to be inserted into the yokes of the front transverse rib of said fairing have an oblong shape extending in a direction parallel to the longitudinal axis of the fairing, and the openings of the fittings intended to be inserted into the yokes of the rear transverse rib of said fairing have an oblong shape extending along an axis perpendicular to said longitudinal axis of said fairing.

According to one embodiment, the peg has a conical or frustoconical shape.

According to one embodiment, the fixing elements are countersunk screws and all or part of each of the bores of the yokes of the aircraft pylon comprises an internal screw thread of a shape that complements a screw thread of said countersunk screws.

According to one embodiment, just six mechanical connection interfaces are used between the primary structure and the fairing, the peg being duplicated and the front transverse rib comprising a second through opening.

Another subject of the invention is an aircraft comprising a fairing as described hereinabove, or a fairing assembly like the aforementioned, or an aircraft pylon as described hereinabove.

A final subject of the invention is a method for assembling an aircraft pylon fairing as described hereinabove, the method comprising:

push-fitting the fairing onto the peg of the primary structure of the aircraft pylon, then positioning the four yokes of the fairing around the four fittings of the primary structure in such a way as to align the bores of the yokes with the oblong openings of the fittings, the fittings each being inserted into one of the yokes, then inserting each of the four fixing elements into a bore of a yoke into which a fitting has been inserted and into the oblong opening in the fitting so as to hold the fairing of the aircraft pylon in position on the primary structure in a statically determinate manner.

BRIEF DESCRIPTION OF THE DRAWINGS

The abovementioned features of the invention, together with others, will become more clearly apparent from reading the following description of one exemplary embodiment, said description being given with reference to the attached drawings.

DETAILED DESCRIPTION OF THE PREFERRED EMBODIMENTS

Figure 1:
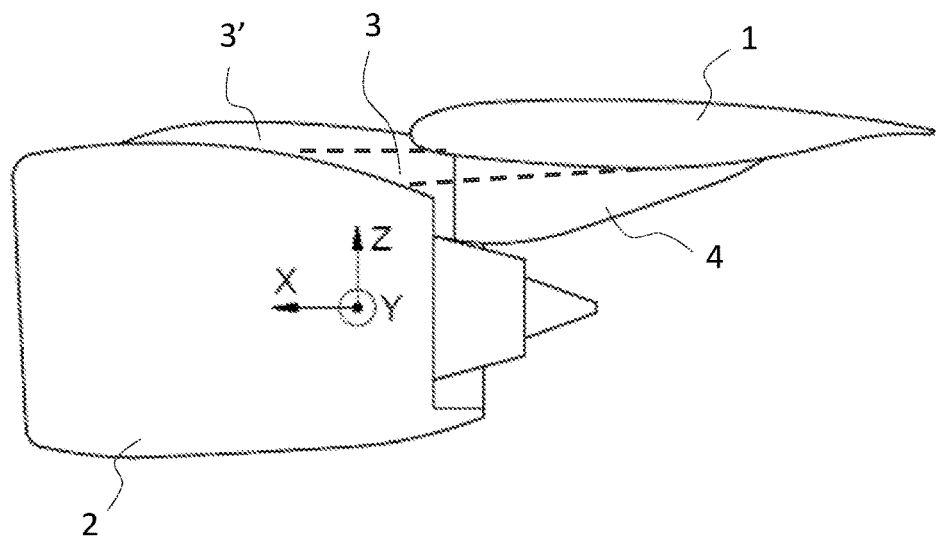
FIG. 1 schematically illustrates a powertrain assembled beneath an aircraft wing structure via a mounting pylon with fairing.

FIG. 1 illustrates an aircraft wing structure 1 beneath which a powertrain 2 is assembled by way of an engine pylon 3. A front fairing 3' and a rear fairing 4 cover the engine pylon 3 for the purposes of obtaining good aerodynamic performance. The engine pylon 3 is an element of the primary structure of the aircraft, which is to say the "vital" structure of the aircraft which is indispensable to flight. The fairings 3' and 4 are elements of the secondary structure of the aircraft. They contribute to improving the aerodynamic performance for flight and make it possible to reduce fuel consumption. In the present description, a direction X is defined as being a direction in which the fuselage of the aircraft comprising the elements described in FIG. 1 is directed; a direction Y is a transverse direction perpendicular to the direction X and defining, with the direction X, a horizontal plane; and a direction Z is a direction directed vertically, perpendicular to the direction X and perpendicular to the direction Y. Thus, the directions X, Y and Z define a rectangular frame of reference and the aircraft when in flight travels in the X-direction when the flight is symmetrical (in the absence of any side slip of the aircraft in the air). The engine pylon 3 comprises a fitting 30 on which a fixing support 31 bearing a peg 32 is fixed, this potentially being duplicated. These elements 30, 31 and 32, used for securing the fairing 4, have not been depicted in FIG. 1 but are visible in FIG. 2.

In the present description, the rear fairing 4 is referred to indiscriminately as "fairing", "rear fairing", "engine pylon fairing" or "secondary structure fairing".

In addition, in the present description, the term "front" refers to a part of an element that is oriented towards or situated on the side towards which the airplane moves when in flight, and the term "rear" refers to a part of an element that is oriented in the opposite direction to the front, which is to say in the direction that the airplane leaves vacant having moved through the air. Furthermore, in the present description, the terms "bottom" and "lower" refer to a part of a component that is directed towards or situated on the side of the ground when the aircraft is on the ground or is performing a normal cruising flight at a stable altitude, and the terms "top" and "upper" refer to a part of a component that is oriented towards or situated on the side of the sky when the aircraft is on the ground or is performing normal cruising flight at a stable altitude.

Figure 2:
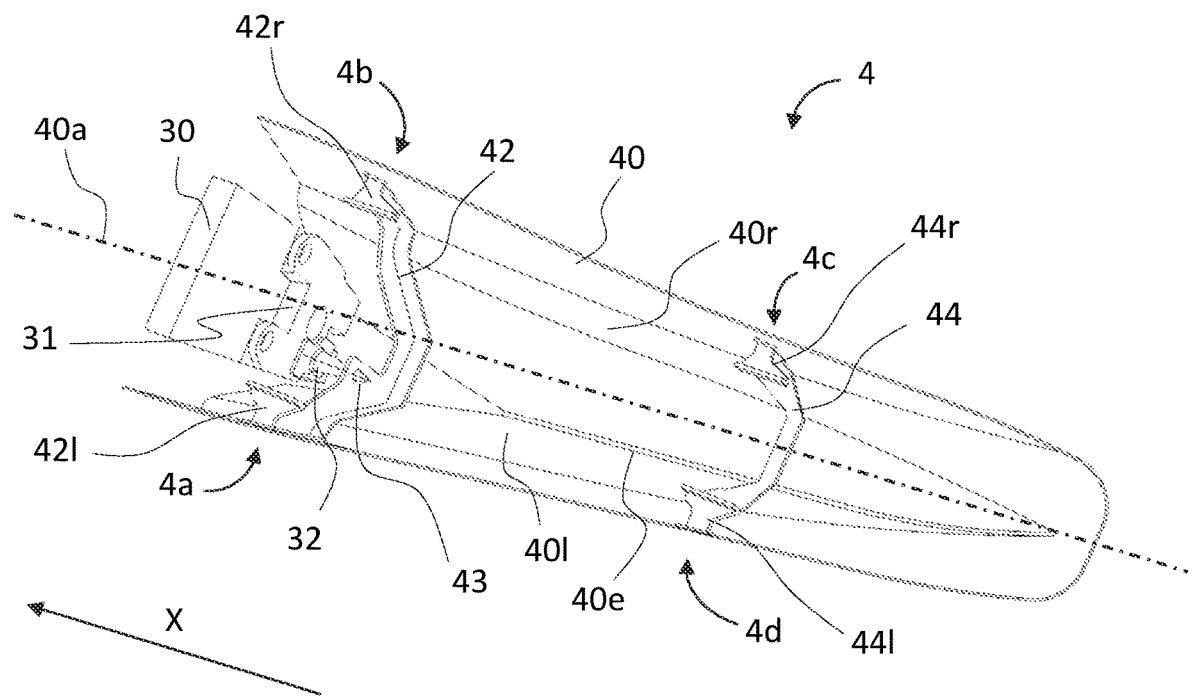
FIG. 2 schematically and in perspective illustrates an aircraft fairing according to one embodiment, positioned facing a primary structure element.

FIG. 2 depicts the rear fairing 4 in a perspective view from above when this fairing is positioned facing the fitting 30 of the primary structure 3, bearing the peg mount 31 on which the fairing positioning peg 32 is assembled. The fairing 4 is of elongate overall appearance, taking the form of a shell open at the top, and has a longitudinal axis 40a. A fairing wall 40 has two flanks 401 and 40r opposite one another and respectively oriented towards the left and towards the right when the fairing 4 is assembled on the primary structure 3.

According to one embodiment, the longitudinal axis 40a is parallel to the direction X when the fairing 4 is assembled on the aircraft primary structure 3. The fairing 4 is cleverly assembled on the primary structure 3 by push-fitting the fairing positioning peg 32 into an opening 43 arranged in a lug of a front transverse rib 42 of the fairing 4, which rib 42 has the overall shape of a U, and by four fixing interfaces 4a, 4b, 4c and 4d arranged in the upper part of the fairing 4.

According to one embodiment, the flanks 401 and 40r meet to form a lower ridge 40e in the bottom part of the fairing 4. The front transverse rib 42 is fixed securely to the fairing wall 40 and therefore to the flanks 401 and 40r, and gives the fairing 4 strength. The front transverse rib 42, which extends perpendicular to the longitudinal axis 40a, on each side thereof, has two fairing fixing yokes 421 and 42r.

According to one embodiment, the rib 42 has the overall shape of a U and each part of the rib 42 which extends on each side perpendicular to the longitudinal axis 40a backs up against a front part of one of the flanks 401 and 40r of the fairing 4.

According to embodiment variants, the front transverse rib 42 may be solid or perforated. The yoke 421 is arranged at the end of the front transverse rib 42 situated on the left side of the aircraft when the fairing is assembled with the primary structure 3, and the yoke 42r is arranged at the end of the front transverse rib 42 that is situated on the right side of the aircraft when the fairing is assembled with the primary structure 3. Similarly, a rear transverse rib 44, held securely to the wall 40 and the flanks 401 and 40r of which extend transverse on each side of the longitudinal axis 40a and perpendicular thereto.

According to one embodiment, the rib 44 has the overall shape of a U and each part of the rib 44 that extends on each side perpendicular to the longitudinal axis 40a backs up against a rear part of one of the flanks 401 and 40r of the fairing 4.

According to variant embodiments, the rear transverse rib 44 may be solid or perforated. Just like the front transverse rib 42, the rear transverse rib 44 provides the fairing 4 with rigidity and offers fixing interface points. For that, yokes 441 and 44r are respectively arranged at the ends of the rear transverse rib 44. Advantageously, each of the fixing yokes 421, 42r, 441 and 44r takes the form of a U-shaped fitting comprising two arms in which a through bore is made to enable fixing of a fitting that is inserted between the two arms of the yoke and comprises a through opening, when this through opening is positioned in line with the bore made in the two arms of the yoke. Quite clearly, the through opening in a fitting configured to be fixed to the yoke is configured to accept a fixing element inserted into the bore of the yoke or, more specifically, into each of the two bores arranged respectively in the two arms of the yoke and aligned along the one same central axis.

Figure 3:
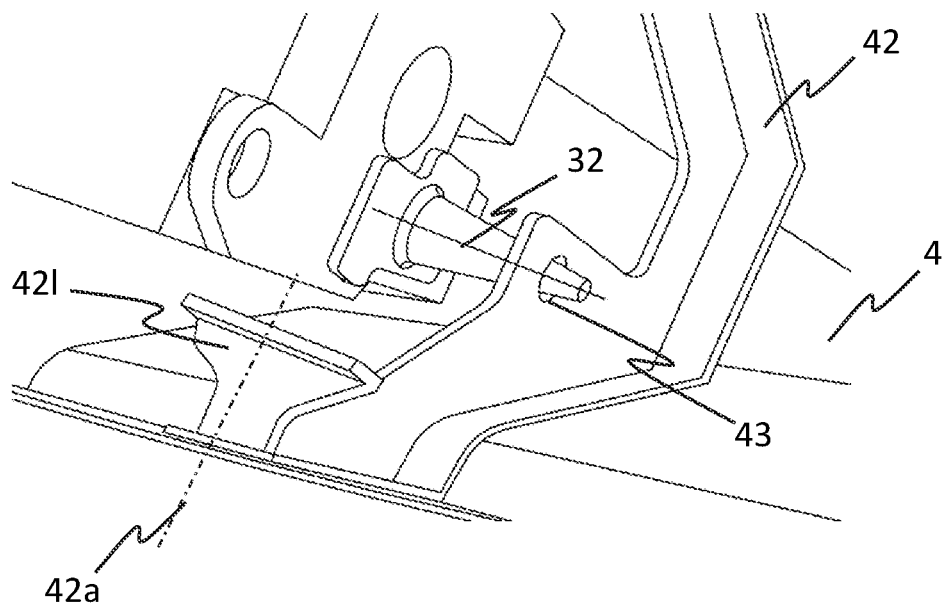
FIG. 3 is an enlargement of part of FIG. 2, illustrating a fairing-positioning peg and a fairing-fixing yoke.

FIG. 3 depicts part of the fairing 4 already depicted in FIG. 2 and enlarged to illustrate the details of the peg 32 push-fitted into the opening 43 in the front transverse rib 42, and the yoke 421. Advantageously, the bore of the yoke 421 is produced along a central axis 42a perpendicular to the longitudinal axis 40a of the fairing 4.

According to one embodiment, the peg 32 has a conical or frustoconical shape aimed at making it easier to guide the fairing 4 relative to the peg 32 when the one is being push-fitted on the other.

Figure 4:
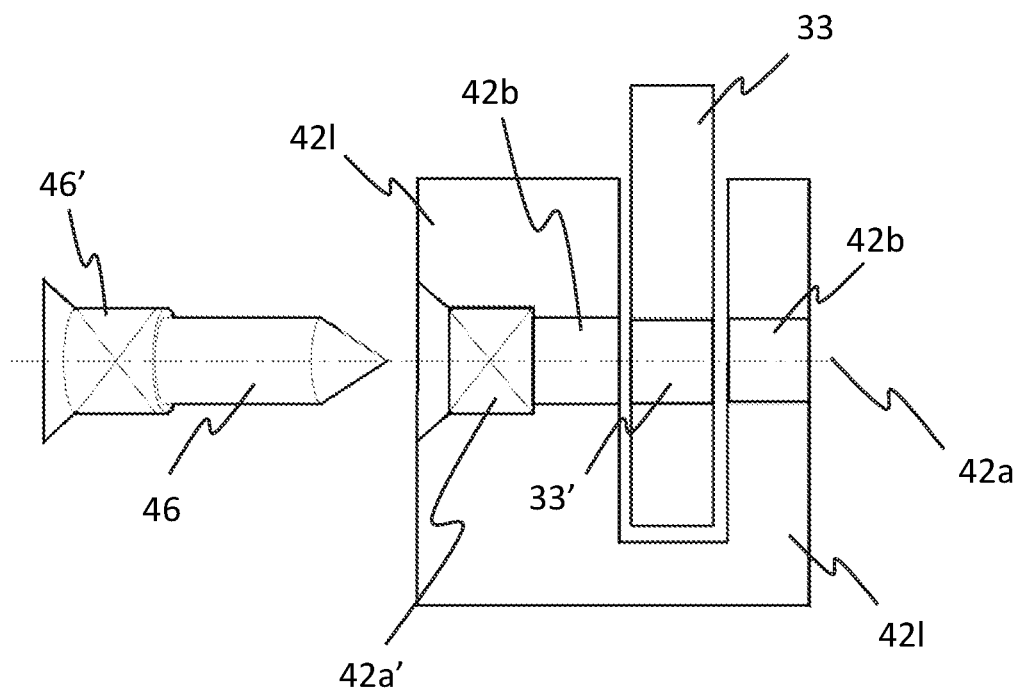
FIG. 4 is a cross section schematically illustrating a fairing front fixing yoke and a fixing element configured to lock a primary-structure fitting in the fairing fixing yoke.

FIG. 4 depicts a section on a plane YZ of the fixing yoke 421 and forming the fixing interface with a fitting 33 of the primary structure 3. A bore 42b is produced through the two arms of the yoke 421, along a central bore axis 42a. The fitting 33 of the fixing interface 4a comprises a bore 33' configured to accept a portion 46" of a countersunk screw 46 when the screw 46, which has a screw thread 46', is screwed into the arm of the yoke 421 that has a tapped thread 42a' that complements the screw thread 46'.

According to one preferred embodiment, the opening 33' of the fixing interface 4a (together with that of the fixing interface 4b) has an oblong shape extending in the direction Z. The presence of an oblong shape advantageously makes it possible to maintain static determinacy of the assembly of the fairing 4 on the primary structure 3 since, as will be detailed later on, the fittings 33 of the rear fixing interfaces arranged on the rear transverse rib 44 preferably have an oblong shape extending in the direction X. Quite clearly, it is possible for the fixing element 46 not to be a screw, but rather any other fixing element configured to be inserted into the bore 42b of each of the yoke arms to pass simultaneously through the oblong opening 33' when the fitting 33 has been inserted into the yoke 421 and be locked in position to prevent any disassembly of the interface and loss of the fixing element 46. For example, the fixing element 46 may be a pin or a key, the head of which has a smooth shape so as to offer continuity of surface with the fairing 4 and the diameter of which allows it to be forcibly inserted for the purposes of holding the fixing element 46 in position once it has been inserted into the yoke 421. Advantageously, this configuration allows the fairing to be fixed from the outside of the fairing 4, appreciably simplifying the operations of fitting and of removal and making it possible to dispense with the need to employ inspection hatches in the fairing 4.

The fairing fixing yoke 42r is produced according to similar principles except for the fact that it is arranged symmetrically with the yoke 421 with respect to the longitudinal axis 40a so as once again to allow a fixing element 46 to be inserted from outside the fairing without requiring complex operations when fitting and removing and without requiring inspection hatches in the fairing 4.

According to one embodiment, the opening 33' of the fitting 33 that is configured to be inserted into the yoke 42r likewise has an oblong shape extending in the direction Z. Thus, the two openings 33' of the two fittings 33 that are configured to be inserted respectively into the yokes 421 and 42r of the front transverse rib 42 both have an oblong opening extending along the axis Z and of a width equal to the diameter of the bore 42b and a length greater than this diameter.

Figure 5:
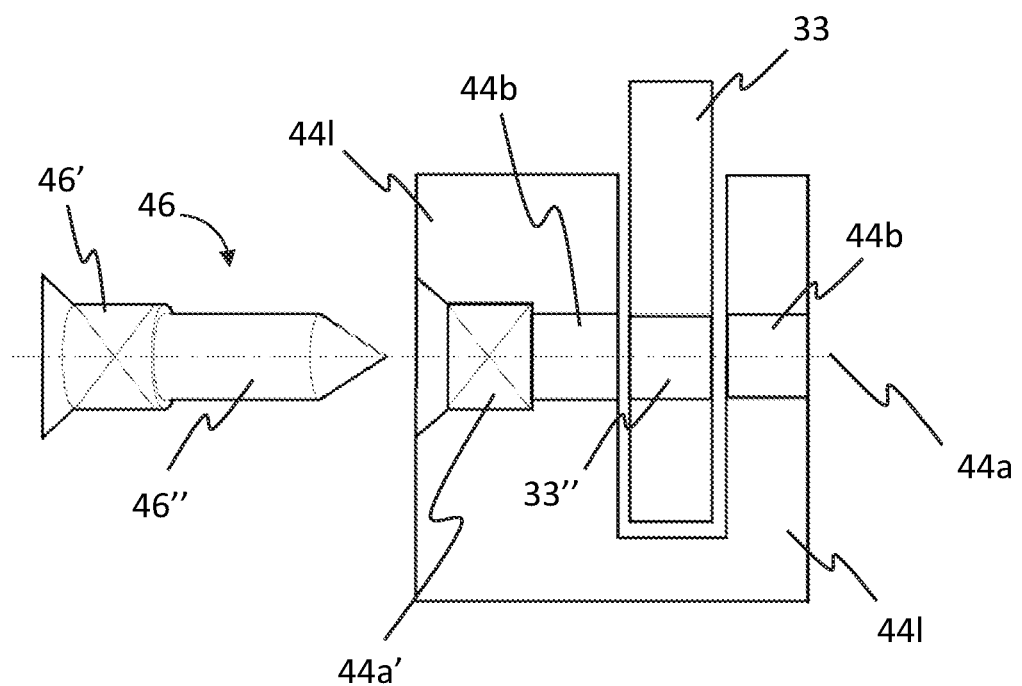
FIG. 5 is a cross section schematically illustrating a fairing rear fixing yoke and a fixing element configured for locking a primary-structure fitting in the fairing fixing yoke.

FIG. 5 illustrates the fixing yoke 441 arranged on the rear transverse rib 44. The yoke comprises two arms in which a bore 44b has been made along a longitudinal axis 44a perpendicular to the longitudinal axis 40a of the fairing 4. An internal thread (or tapped thread) 44a' allows the insertion of a fixing element 46 when the latter is implemented in the form of a screw, and holds the screw in position. Once again, the fixing element may be different from a screw, provided that it holds the fitting 33 configured to be inserted into the yoke 441 in position when the fairing 4 is in the nominal position of assembly on the primary structure 3. The only appreciable difference between the fixing interfaces to which the yokes 421 and 42r contribute is that a through opening 33" made in the fitting 33 preferably has an oblong shape extending in a direction X. The fixing yoke 44r is similar to the fixing yoke 441 except that it is arranged symmetrically with the latter with respect to the longitudinal axis 40a of the fairing 4 so as to allow a fixing element 46 to be inserted from outside the fairing 4 without the need for complex operations or inspection hatches.

According to one preferred embodiment, the fixing interfaces 4a and 4b for fixing the fairing 4 to the primary structure 3 therefore each have an oblong opening 33' which extends in the direction Z and the fixing interfaces 4c and 4d for fixing the fairing 4 to the primary structure 3 each have an oblong opening 33' which extends in the direction X. That advantageously allows the main paths (or main directions) and the secondary paths (or secondary directions) for load transfer between the fairing 4 and the primary structure 3 to be disconnected. More specifically, the main load transfer path of the fixing interfaces 4a and 4b is in the direction X and the secondary load transfer path for these same interfaces 4a and 4b is in the direction Y. According to a similar principle, the main load transfer path for the fixing interfaces 4c and 4d is in the direction Z and the secondary load transfer path for these same interfaces 4c and 4d is in the direction Y.

Finally, load transfer in the directions Y and Z, used as main load transfer paths, can take place via the fixing interface implemented by the peg 32 operating together with the opening 43 in the front transverse rib 42, possibly duplicated by a second peg and a second opening in order to create a second fixing assembly (peg and opening) similar to the assembly formed by the peg 32 and the opening 43.

Advantageously, the main load transfer paths described above contribute to isostatically determinant fixing of the fairing 4 to the primary structure 3 and the secondary load transfer paths are not activated under normal conditions of use (which is to say in the absence of abnormal physical stresses on the fairing 4 and/or the primary structure 3 that supports it). Advantageously, the fairing 4 has stiffness properties that are slightly inferior along the secondary load transfer paths than along the main load transfer paths so that assembling the fairing 4 on the primary structure 3 maintains a statically determinate nature under normal conditions of use but so that the secondary load transfer paths can nevertheless be brought into action when a main load transfer path fails or becomes inoperative (on account of at least partial breakage of a fixing interface).

According to an embodiment variant, the through openings 33' in the yokes 42l and 42r of the front transverse rib 42 and the through openings 33" in the yokes 44l and 44r of the rear transverse rib 44 do not have oblong openings but bores the diameter of which is at least equal to the diameter of the bore in the arm of each yoke in which the fitting 33 is inserted. However, this configuration is not preferred because it leads to static indeterminacy of the assembly, which could have a tendency to exert needless mechanical stresses between the primary structure 3 and the fairing 4.

According to one embodiment, the peg 32 and the opening 43 in the front transverse rib 42 are both duplicated to form a failsafe push-fitting of a pin 32' into an opening 43' if the first push fit becomes defective or inoperative.

Figure 8:
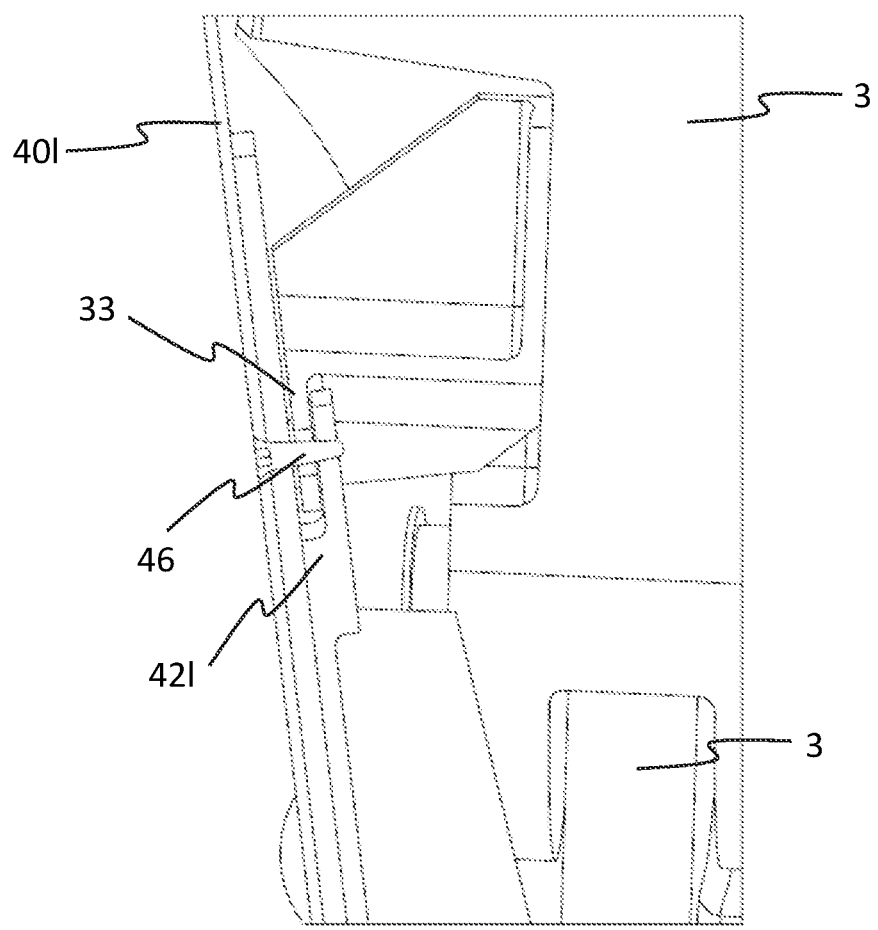
FIG. 8 is a cross section in perspective illustrating details of a fixing interface between part of an aircraft pylon fairing and a primary structure, according to one embodiment.

FIG. 8 illustrates details of the fixing interface 4a already depicted elsewhere in FIG. 2, FIG. 3 and FIG. 4. The fixing element 46 holds the fitting 33 fixed in position in the yoke 42l of the front transverse rib 42. That allows the front part of the flank 401 of the fairing 4 to be fixed to the primary structure 3, which comprises the fitting 33.

Figure 6:
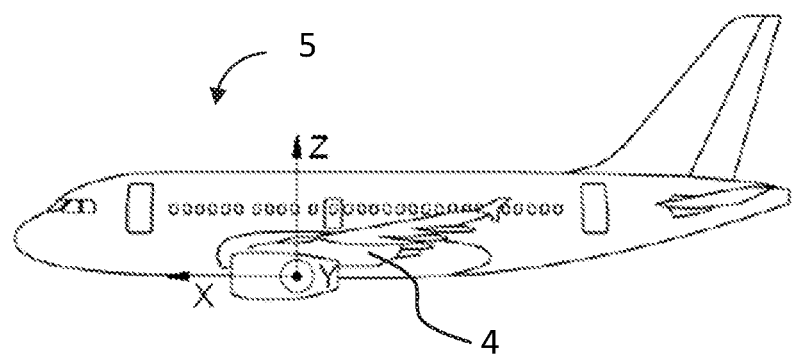
FIG. 6 schematically illustrates an aircraft comprising a fairing according to one embodiment.

FIG. 6 depicts an aircraft 5 advantageously comprising a fairing 4. According to one embodiment, the fairing 4 constitutes, with four fixing elements 46, a fairing assembly 4 on the primary structure 3 (the engine pylon 3). The engine pylon 3 therefore advantageously comprises such a fitting assembly aimed at making it easier to assemble while at the same time preferably maintaining statically determinate mounting of the fairing on the primary structure 3.

Advantageously, in the event of complete breakage of one of the fixing interfaces 4a, 4b, 4c or 4d between the aircraft pylon fairing 4 and the primary structure 3, the fixing interfaces that remain intact will ensure a good balance of the forces present on the aircraft pylon fairing 4.

According to one preferred embodiment, the fixing-yoke bores in the yokes 42l, 42r, 44l and 44r are produced about axes respectively oriented in the direction Y.

Figure 7:
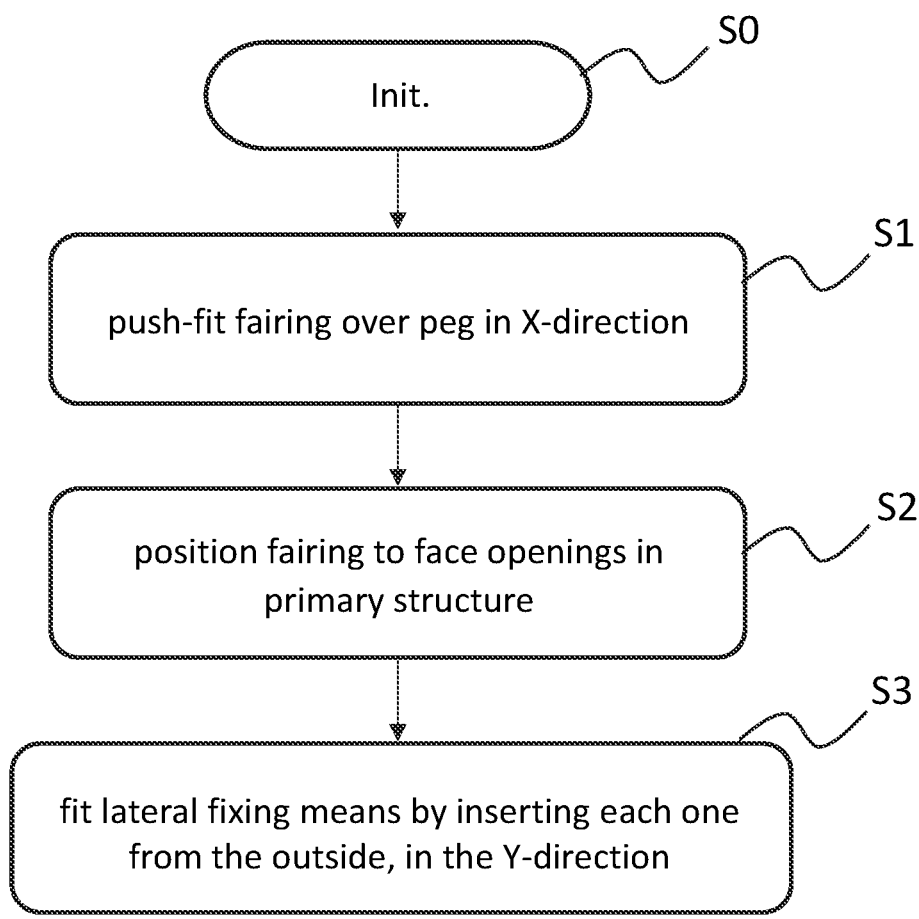
FIG. 7 is a diagram illustrating a method for assembling an aircraft pylon comprising a fairing according to one embodiment.

FIG. 7 illustrates a method for assembling the fairing 4 on the primary structure of an aircraft, such as the aircraft 5. A step S0 is a step of preparing for assembly at the end of which the fairing and the primary structure are ready to be assembled by one or more assembly operators. During a step S1, the fairing 4 is brought closer to the primary structure 3 and notably to the positioning peg 32. The opening 43 in the front transverse rib 42 is push-fitted over the peg 32. The fairing is then positioned accurately during a step S2 so that each of the four fittings 33 is positioned in such a way that its through opening 33' or 33", according to whether it is intended for a front or a rear yoke, is aligned facing the bore in the corresponding yoke. At the end of step S2, the positioning of the fairing 4 with respect to the primary structure 3 and notably to the fittings 33 of the primary structure 3 is such that it is possible to insert the four fixing elements 46. Finally, in a step S3, the fixing element 46 are inserted into the bores in the four fixing yokes and locked in position. The mounting of the fairing 4 on the primary structure is advantageously easy and maintains the advantages of statically determinate mounting.

Furthermore, the presence of oblong through openings in the fittings 33, the openings respectively extending two of them in a direction X and two in a direction Z, allows the forces to be transferred in a main direction in the absence of any fault, in a statically determinate manner, and then forces to be transferred in another direction if one fixing interface should fail.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft pylon fairing assembly comprising:
   an aircraft pylon fairing extending along a longitudinal axis, the aircraft pylon fairing comprising:
   a wall having at least two opposite flanks oriented respectively one on each side of said longitudinal axis,
   a central interior cavity, the at least two opposite flanks meeting in a lower or an upper part of said fairing,
   a front transverse rib securely fixed to said wall and extending perpendicularly on each side of said longitudinal axis, said front transverse rib comprising a through opening configured to accept a peg of an exterior structure by push-fitting in a direction parallel to said longitudinal axis, and comprising two yokes each having bores along an axis oriented perpendicular to said longitudinal axis of the fairing and arranged facing a through opening in one of said opposing flanks, and
   a rear transverse rib securely fixed to said wall and extending perpendicularly on each side of said longitudinal axis and comprising two yokes each having bores along an axis oriented perpendicular to said longitudinal axis of the fairing and arranged facing another through opening in one of said opposing flanks,
   the aircraft pylon fairing assembly further comprising four fixing elements which are configured to each be inserted into and held in position in the bore of one of said yokes of the front transverse rib and the rear transverse rib,
   wherein the aircraft pylon fairing is a secondary structure which contributes to an aerodynamic performance of a flight, and
   wherein the exterior structure is an aircraft primary structure indispensable for the flight,
   wherein the peg of said aircraft primary structure is oriented along an axis parallel to the longitudinal axis of the fairing and configured to be inserted into said through opening of said front transverse rib, and wherein said aircraft primary structure comprises four fittings which are respectively arranged in such a way as to each be inserted into one of said yokes of said front transverse rib and said rear transverse rib, and each having a through opening configured to be arranged facing said bore of said yoke and configured to receive a portion of one of said four fixing elements which is inserted into said bore of said yoke, said openings in the fittings which are configured to be inserted into the yokes of the front transverse rib of said fairing having an oblong shape extending in a direction perpendicular to the longitudinal axis of the fairing, and said openings in the fittings that are configured to be inserted into the yokes of the rear transverse rib of said fairing having an oblong shape extending along an axis parallel to said longitudinal axis of said fairing, or vice versa.

2. The aircraft pylon fairing assembly according to claim 1, wherein said openings in the fittings configured to be inserted into the yokes of the front transverse rib of said fairing have the oblong shape extending in the direction perpendicular to the longitudinal axis of the fairing, and
wherein said openings of the fittings configured to be inserted into the yokes of the rear transverse rib of said fairing have the oblong shape extending along the axis parallel to said longitudinal axis of said fairing.

3. The aircraft pylon fairing assembly according to claim 1, wherein said openings in the fittings configured to be inserted into the yokes of the front transverse rib of said fairing have an oblong shape extending in a direction parallel to the longitudinal axis of the fairing, and
wherein said openings of the fittings configured to be inserted into the yokes of the rear transverse rib of said fairing have an oblong shape extending along an axis perpendicular to said longitudinal axis of said fairing.

4. The aircraft pylon fairing assembly according to claim 1, wherein the peg has a conical or frustoconical shape.

5. The aircraft pylon fairing assembly according to claim 1, wherein the fixing elements are countersunk screws, and
wherein all or part of each of said bores comprises an internal screw thread of a shape that complements a screw thread of said screws.

6. An aircraft comprising the aircraft pylon fairing assembly according to claim 1.

7. A method for assembling the aircraft pylon fairing assembly according to claim 1, the method comprising:
push-fitting the fairing onto the peg of the aircraft primary structure, then
positioning said yokes of the fairing around the four fittings of the aircraft primary structure in such a way as to align said bores of said yokes with said oblong openings of said fittings, said fittings each being inserted into one of said yokes, and then
inserting each of the four fixing elements into the bore of said yoke into which said fitting has been inserted and into the oblong opening in said fitting so as to hold the fairing in position on said aircraft primary structure in a statically determinate manner.

* * * * *